United States Patent
Tsai et al.

(10) Patent No.: US 11,743,926 B2
(45) Date of Patent: Aug. 29, 2023

(54) METHOD AND APPARATUS FOR DYNAMIC PHYSICAL DOWNLINK CONTROL CHANNEL MONITORING IN MOBILE COMMUNICATIONS

(71) Applicant: MediaTek Inc., Hsinchu (TW)

(72) Inventors: Chiou-Wei Tsai, Hsinchu (TW); Cheng-Rung Tsai, Hsinchu (TW)

(73) Assignee: MediaTek Inc.

(*) Notice: Subject to any disclaimer, the term of this patent is extended or adjusted under 35 U.S.C. 154(b) by 120 days.

(21) Appl. No.: 17/061,391

(22) Filed: Oct. 1, 2020

(65) Prior Publication Data
US 2021/0144717 A1    May 13, 2021

Related U.S. Application Data

(60) Provisional application No. 62/941,113, filed on Nov. 27, 2019, provisional application No. 62/932,564, filed on Nov. 8, 2019.

(51) Int. Cl.
| | | |
|---|---|---|
| H04W 4/00 | (2018.01) | |
| H04W 72/53 | (2023.01) | |
| H04W 24/10 | (2009.01) | |
| H04W 8/24 | (2009.01) | |
| H04W 74/08 | (2009.01) | |
| H04W 72/23 | (2023.01) | |

(52) U.S. Cl.
CPC .............. *H04W 72/53* (2023.01); *H04W 8/24* (2013.01); *H04W 24/10* (2013.01); *H04W 72/23* (2023.01); *H04W 74/0816* (2013.01)

(58) Field of Classification Search
None
See application file for complete search history.

(56) References Cited

U.S. PATENT DOCUMENTS

| | | | |
|---|---|---|---|
| 10,631,280 B2* | 4/2020 | Baldemair | H04W 74/0833 |
| 11,546,940 B2* | 1/2023 | Hedayat | H04W 72/23 |
| 2016/0149672 A1* | 5/2016 | Shimezawa | H04L 5/0094 |
| | | | 370/329 |
| 2016/0192335 A1* | 6/2016 | Kusashima | H04W 72/23 |
| | | | 370/280 |
| 2017/0367046 A1* | 12/2017 | Papasakellariou | H04L 5/0053 |
| 2018/0227777 A1* | 8/2018 | Sun | H04W 52/0212 |
| 2018/0254794 A1* | 9/2018 | Lee | H04L 5/0064 |
| 2019/0053270 A1* | 2/2019 | Akoum | H04W 72/085 |
| 2019/0082355 A1* | 3/2019 | Ryoo | H04W 24/08 |

(Continued)

*Primary Examiner* — Bob A Phunkulh
(74) *Attorney, Agent, or Firm* — Han IP PLLC; Andy M. Han

(57) ABSTRACT

Various solutions for dynamic physical downlink control channel (PDCCH) monitoring with respect to user equipment and network apparatus in mobile communications are described. An apparatus may receive a switching group configuration indicating a group of serving cells which are bundled. The apparatus may receive a first configuration and a second configuration. The apparatus may perform control signal monitoring according to the first configuration. The apparatus may determine to switch to the second configuration on a first serving cell of the group of serving cells according to an indication associated with the first serving cell. The apparatus may apply the switching to all serving cells within the group of serving cells according to the indication associated with the first serving cell.

20 Claims, 6 Drawing Sheets

(56) References Cited

U.S. PATENT DOCUMENTS

| | | | | |
|---|---|---|---|---|
| 2019/0159230 | A1* | 5/2019 | Kim | H04L 5/0082 |
| 2019/0313383 | A1* | 10/2019 | Xiong | H04W 16/14 |
| 2020/0029315 | A1* | 1/2020 | Lin | H04L 5/0094 |
| 2020/0037248 | A1* | 1/2020 | Zhou | H04B 7/022 |
| 2020/0053571 | A1* | 2/2020 | Tsai | H04L 1/0045 |
| 2020/0068579 | A1* | 2/2020 | Hang | H04W 72/042 |
| 2020/0100154 | A1* | 3/2020 | Cirik | H04W 36/0072 |
| 2020/0195410 | A1* | 6/2020 | Li | H04W 52/0216 |
| 2020/0260415 | A1* | 8/2020 | Li | H04L 1/0038 |
| 2020/0288479 | A1* | 9/2020 | Xi | H04W 72/042 |
| 2020/0367253 | A1* | 11/2020 | Kim | H04W 72/042 |
| 2021/0076445 | A1* | 3/2021 | Tsai | H04L 5/003 |
| 2021/0266909 | A1* | 8/2021 | Lin | H04W 48/12 |
| 2021/0329481 | A1* | 10/2021 | Xue | H04W 52/0216 |
| 2021/0352633 | A1* | 11/2021 | Tiirola | H04L 5/0094 |
| 2021/0385668 | A1* | 12/2021 | Kang | H04W 16/28 |
| 2021/0400649 | A1* | 12/2021 | Kang | H04L 5/0094 |
| 2021/0410171 | A1* | 12/2021 | Fu | H04W 72/23 |
| 2022/0239424 | A1* | 7/2022 | Tiirola | H04L 5/1469 |

* cited by examiner

METHOD AND APPARATUS FOR DYNAMIC PHYSICAL DOWNLINK CONTROL CHANNEL MONITORING IN MOBILE COMMUNICATIONS

CROSS REFERENCE TO RELATED PATENT APPLICATION(S)

The present disclosure claims the priority benefit of U.S. Provisional Patent Application No. 62/932,564, filed on 8 Nov. 2019, and U.S. Provisional Patent Application No. 62/941,113, filed 27 Nov. 2019. The contents of aforementioned applications are herein incorporated by reference in their entirety.

TECHNICAL FIELD

The present disclosure is generally related to mobile communications and, more particularly, to dynamic physical downlink control channel (PDCCH) monitoring with respect to user equipment and network apparatus in mobile communications.

BACKGROUND

Unless otherwise indicated herein, approaches described in this section are not prior art to the claims listed below and are not admitted as prior art by inclusion in this section.

5G New Radio (NR) in unlicensed spectrum (NR-U) is a new mode of operation that provides the necessary technology for cellular operators to fully integrate the unlicensed spectrum into 5G networks. NR-U enables both uplink and downlink operation in unlicensed bands for supporting 5G new features. In NR-U, channel access in both downlink and uplink rely on the listen-before-talk (LBT) mechanism. The LBT procedure is a mechanism by which a device should apply a clear channel assessment (CCA) check (e.g., spectrum sensing for a certain period) before using the communication channel and which imposes certain rules after determining the channel to be busy. CCA uses energy detection to detect the presence (e.g., channel is busy) or absence (e.g., channel is idle) of other signals on the communication channel. If the detected energy during an initial CCA period is lower than a certain threshold, the device can access the communication channel for a period called channel occupancy time (COT).

For unlicensed band operation, a user equipment (UE) may be configured with at least two sets of PDCCH configurations. For example, based on a first set of PDCCH configuration, the UE may be configured to conduct more frequent PDCCH monitoring for at least outside of a network node's COT. When the UE has determined that it is inside a network node's COT, the UE may adjust its PDCCH monitoring behavior based on a second set of PDCCH configuration which may configure UE with less frequent PDCCH monitoring occasions to reduce UE's PDCCH monitoring efforts.

NR-U also supports dynamic PDCCH monitoring. The UE may be configured to dynamically switch between different sets of PDCCH monitoring configurations. The dynamic PDCCH switching between different sets of PDCCH configurations can be indicated explicitly via PDCCH or implicitly based on at least one of the detection of downlink signals and/or channels, the end of a COT duration, and a timer.

However, in the dynamic PDCCH monitoring mechanism, when an implicit/explicit indication has detected/ received in one serving cell, whether and how the UE should apply the dynamic PDCCH switching to other serving cells are not discussed and determined. Since the UE may be configured with one or multiple serving cells, how to apply the dynamic PDCCH switching must be defined to avoid ambiguity and malfunction at the UE and the network side.

Accordingly, how to design and perform the dynamic PDCCH switching becomes an important issue for the newly developed wireless communication network. Therefore, there is a need to provide proper schemes to define the behaviors/procedures for the UE to apply and perform the dynamic PDCCH switching to avoid ambiguity and malfunction at the UE and the network side.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to dynamic PDCCH monitoring among a plurality of serving cells with respect to user equipment and network apparatus in mobile communications.

In one aspect, a method may involve an apparatus receiving a switching group configuration indicating a group of serving cells which are bundled. The method may also involve the apparatus receiving a first configuration and a second configuration. The method may further involve the apparatus performing control signal monitoring according to the first configuration. The method may further involve the apparatus determining to switch to the second configuration on a first serving cell of the group of serving cells according to an indication associated with the first serving cell. Then, the method may involve the apparatus applying the switching to all serving cells within the group of serving cells according to the indication associated with the first serving cell.

In one aspect, a method may involve an apparatus transmitting a capability report to indicate a support of search space set group switching. The method may also involve the apparatus receiving a first configuration and a second configuration. The method may further involve the apparatus performing control signal monitoring according to the first configuration. The method may further involve the apparatus determining to switch to the second configuration according to an indication. Then, the method may involve the apparatus performing the control signal monitoring according to the second configuration.

In another aspect, an apparatus may comprise a transceiver which, during operation, wirelessly communicates with a plurality of network nodes of a wireless network. The apparatus may also comprise a processor communicatively coupled to the transceiver. The processor, during operation, may perform operations comprising receiving, via the transceiver, a switching group configuration indicating a group of network nodes which are bundled. The processor may also perform operations comprising receiving, via the transceiver, a first configuration and a second configuration. The processor may further perform operations comprising performing, via the transceiver, control signal monitoring according to the first configuration. The processor may further perform operations comprising determining to switch to the second configuration on a first network node of the group of network nodes according to an indication associated with the first network node. Then, the processor may perform operations comprising applying the switching to all network nodes within the group of network nodes according to the indication associated with the first network node.

In another aspect, an apparatus may comprise a transceiver which, during operation, wirelessly communicates with a plurality of network nodes of a wireless network. The apparatus may also comprise a processor communicatively coupled to the transceiver. The processor, during operation, may perform operations comprising transmitting, via the transceiver, a capability report to indicate a support of search space set group switching. The processor may also perform operations comprising receiving, via the transceiver, a first configuration and a second configuration. The processor may further perform operations comprising performing, via the transceiver, control signal monitoring according to the first configuration. The processor may further perform operations comprising determining to switch to the second configuration according to an indication. Then, the processor may perform operations comprising performing, via the transceiver, the control signal monitoring according to the second configuration.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to dynamic PDCCH monitoring with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In wireless communication, a UE can be configured with one or multiple serving cells and one or multiple bandwidth parts (BWPs) for a serving cell. For a serving cell or a downlink BWP, the UE can be configured with a set of PDCCH configurations to monitor downlink control channels (e.g., PDCCH) on the serving cell or the downlink BWP. The PDCCH configuration can include at least one or multiple of i) control resource set (CORESET) configuration which configures the frequency-domain physical resource block (PRB) location and the number of OFDM symbols, ii) search space set configuration which provides the time-domain monitoring occasions for an associated CORESET, and iii) search space set configuration which provides the frequency-domain monitoring occasion for an associated CORESET.

PDCCH monitoring occasions of the UE can configured by one or multiple search space sets. In a search space set, some parameters are provided such as a search space identification (ID), an association with a CORESET (e.g., a CORESET ID), information of search space type, and information of PDCCH monitoring occasions (e.g., PDCCH monitoring occasions in time-domain and frequency-domain).

Figure 1:
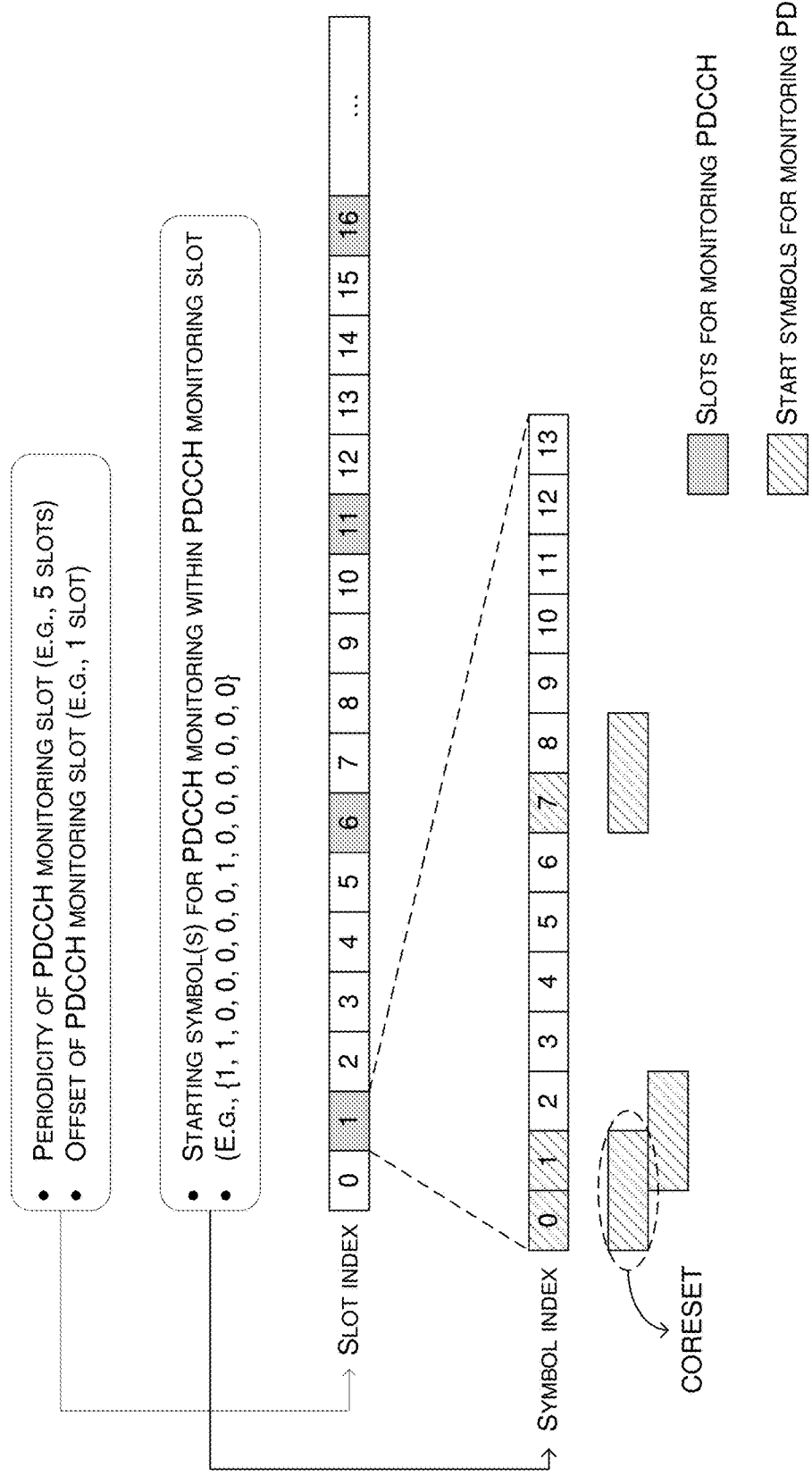
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE and a network node, which may be a part of a wireless communication network (e.g., an LTE network, a 5G network, an NR network, an IoT network, an NB-IoT network or an IIoT network). Scenario 100 illustrates the parameters/configurations provided as the information of PDCCH monitoring occasions. As shown in FIG. 1, the UE may be provided the periodicity of PDCCH monitoring slot (e.g., 5 slots) and the offset of the PDCCH monitoring slot (e.g., 1 slot). Thus, the UE needs to monitor slots 1, 6, 11, 16, etc. The UE may further be provided the starting symbols for PDCCH monitoring within the PDCCH monitoring slots. For example, the starting symbols for PDCCH monitoring may comprise symbol 1, 2 and 7. Thus, the UE may be indicated by a bitmap of {1, 1, 0, 0, 0, 0, 0, 1, 0, 0, 0, 0, 0, 0}. Then, on each PDCCH monitoring occasion, the UE may attempt to detect the PDCCH transmitted by the network node according to the associated CORESET configuration and the information of search space type.

For unlicensed band operation, the UE may be configured with at least two sets of PDCCH configurations. For example, based on a first set of PDCCH configuration, the UE may be configured to conduct more frequent PDCCH monitoring for at least outside of a network node's COT. When the UE has determined that it is inside a network node's COT, the UE may adjust its PDCCH monitoring behavior based on a second set of PDCCH configuration which may configure UE with less frequent PDCCH monitoring occasions to reduce UE's PDCCH monitoring efforts.

NR-U also supports dynamic PDCCH monitoring. The UE may be configured to dynamically switch between different sets of PDCCH monitoring configurations. The dynamic PDCCH switching between different sets of PDCCH configurations can be indicated explicitly via PDCCH or implicitly based on at least one of the detection of downlink signals and/or channels, the end of a COT duration, and a timer.

Figure 2:
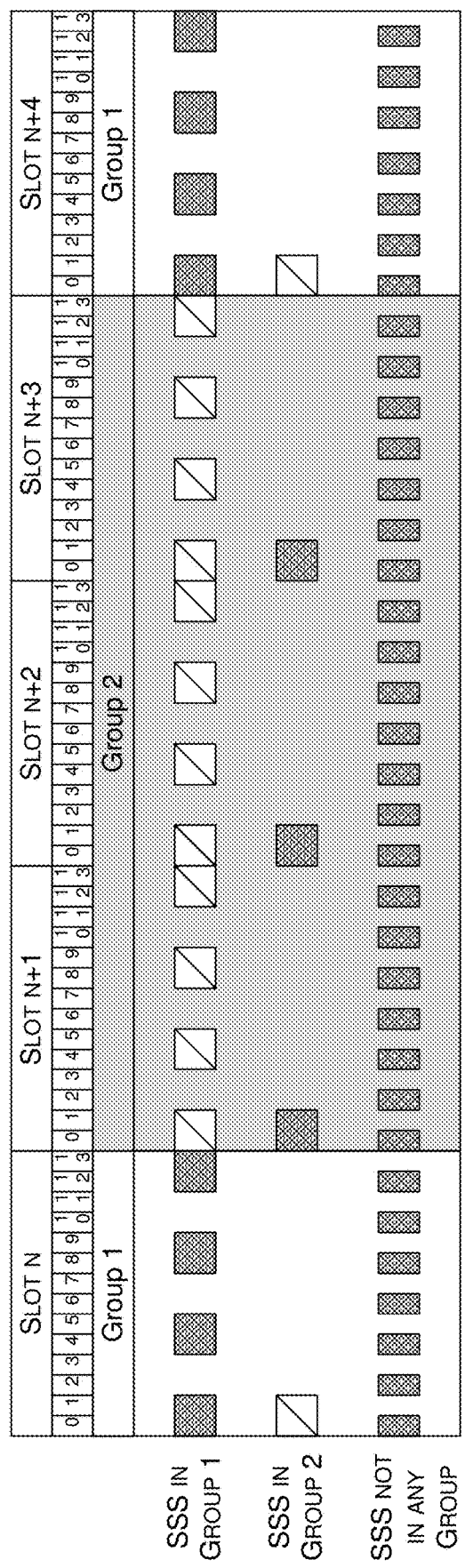
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a plurality of network nodes, which may be a part of a wireless communication network (e.g., an LTE network, a 5G network, an NR network, an IoT network, an NB-IoT network or an IIoT network). Scenario 200 illustrates dynamic PDCCH monitoring based on search space set group switching. As shown in FIG. 2, the UE can be configured with two groups of search space sets (e.g., Group 1 and Group 2). The switching between the two groups can be indicated in an implicit way and/or explicit way. For a search space set that is associated with a group, the UE only has to monitor the PDCCH occasions corresponding to the search space set when the group is activated.

For example, in slot n, the first group of search space set (e.g., Group 1) is activated and the second group of search space set (e.g., Group 2) is not activated. The UE needs to monitor PDCCH on the PDCCH monitoring occasions configured by the first group of search space set, and doesn't need to monitor the PDCCH monitoring occasions configured by the second group of search space set. In slot n+1, an indication of group switching for dynamic PDCCH monitoring may be detected by the UE. The UE may be configured to switch PDCCH monitoring configuration from the first group of search space set to the second group of search space set. Thus, in slot n+1, the UE only need to monitor PDCCH on the PDCCH monitoring occasions configured by the second group of search space set, and doesn't need to monitor the PDCCH monitoring occasions configured by the first group of search space set. Slot n+1 to n+3 may be the COT duration indicated by the network node. Therefore, within the COT duration, the UE can perform PDCCH monitoring with less frequent PDCCH monitoring occasions (e.g., Group 2) to reduce UE's PDCCH monitoring efforts and power consumption. In slot n+4, the UE may detect another indication of group switching for dynamic PDCCH monitoring (e.g., end of the COT duration). The UE may switch back to the first group of search space set. Thus, the UE starts to monitor PDCCH according to the first group of search space set, and doesn't need to monitor PDCCH according to the second group of search space set.

For a search space set that is associated with both groups or not associated with any group, the UE always performs PDCCH monitoring corresponding to the search space set. For example, as shown in FIG. 2, for the search space set (SSS) which is not in any group or in both groups, the UE needs to perform PDCCH monitoring on the PDCCH monitoring occasions configured by the search space set in every slot (e.g., slot n to slot n+4). However, in the dynamic PDCCH monitoring mechanism described above, when an implicit/explicit indication has detected/received in one serving cell, whether and how the UE should apply the dynamic PDCCH switching to other serving cells are not discussed and determined. Since the UE may be configured with one or multiple serving cells, how to apply the dynamic PDCCH switching must be defined to avoid ambiguity and malfunction at the UE and the network side.

In view of the above, the present disclosure proposes a number of schemes pertaining to dynamic PDCCH monitoring among a plurality of serving cells with respect to the UE and the network apparatus. According to the schemes of the present disclosure, the UE may be configured with a group of serving cells which are bundled for search space set group switching. The UE may further be configured with at least two sets of PDCCH configurations for a serving cell. For a serving cell, the UE may monitor PDCCH according to a first set of the PDCCH configurations. The UE may detection an indication to switch to a second set of the PDCCH configurations associated with the first serving cell. Then, the UE may determine to switch to the second set of the PDCCH configurations not only on the first serving cell but also on a second serving cell or all other serving cells within the group of serving cells based on the indication associated with the first serving cell. Accordingly, the dynamic PDCCH monitoring procedures may be applied to all serving cells within the group of serving cells. The behaviors/procedures at the UE and the network side may be clearly defined and properly performed.

Specifically, the UE may be configured and/or connect to a plurality of serving cells. The UE may receiver a switching group configuration indicating a group of serving cells (e.g., a cell group) which are bundled for search space set group switching. The UE may receive a first configuration (e.g., a first PDCCH configuration) and a second configuration (e.g., a second PDCCH configuration). The first configuration may comprise a first group of search space set which comprises more frequent PDCCH monitoring occasions. The second configuration may comprise a second group of search space set which comprises less frequent PDCCH monitoring occasions.

At first, the UE may be configured to perform control signal monitoring (e.g., PDCCH monitoring) according to the first configuration. Then, the UE may determine whether an indication of group switching for dynamic PDCCH monitoring is detected. The indication may associate with a serving cell (e.g., a first serving cell) in the cell group. The UE may determine to switch to the second configuration on the first serving cell of the group of serving cells according to the indication associated with the first serving cell. The UE may further apply the switching to all serving cells within the group of serving cells according to the indication associated with the first serving cell.

In an explicit way, the indication may comprise a switching flag configured to be present for a serving cell in the cell group in a DCI (e.g., group common DCI). The DCI may comprise, for example, DCI format 2_0 and may be carried by a PDCCH (e.g., group common PDCCH). On the serving cell in the cell group (e.g., the first serving cell), in an event that the UE receives the group common DCI including the switching flag (e.g., flag=1) that indicates a switching from the first group of search space set (e.g., Group 1) to the second group of search space set (e.g., Group 2), the UE may determine to switch to the second group of search space set on the first serving cell of the cell group. The UE may further apply the switching to all serving cells within the cell group according to the indication associated with the first serving cell. Then, the UE may start or restart a timer. The timer may be configured for the first serving cell or for the cell group. In an event that the timer expires, the UE may be configured to switches from the second group of search space set (e.g., Group 2) to the first group of search space set (e.g., Group 1) on all serving cells in the cell group immediately of after a time offset.

In an implicit way, in an event that a switching flag is not configured to be present for a serving cell in the cell group in a DCI, the indication may comprise detection of a PDCCH. On the serving cell (e.g., the first serving cell) in the cell group, in an event that the UE successfully detects a PDCCH, the UE may determine to switch to the second group of search space set on the first serving cell of the cell group. The UE may further apply the switching to all serving cells within the cell group according to the indication associated with the first serving cell. Then, the UE may start or restart the timer. The timer may be configured for the first serving cell or for the cell group. In an event that the timer expires, the UE may be configured to switches from the second group of search space set (e.g., Group 2) to the first group of search space set (e.g., Group 1) on all serving cells in the cell group immediately of after a time offset.

Figure 3:
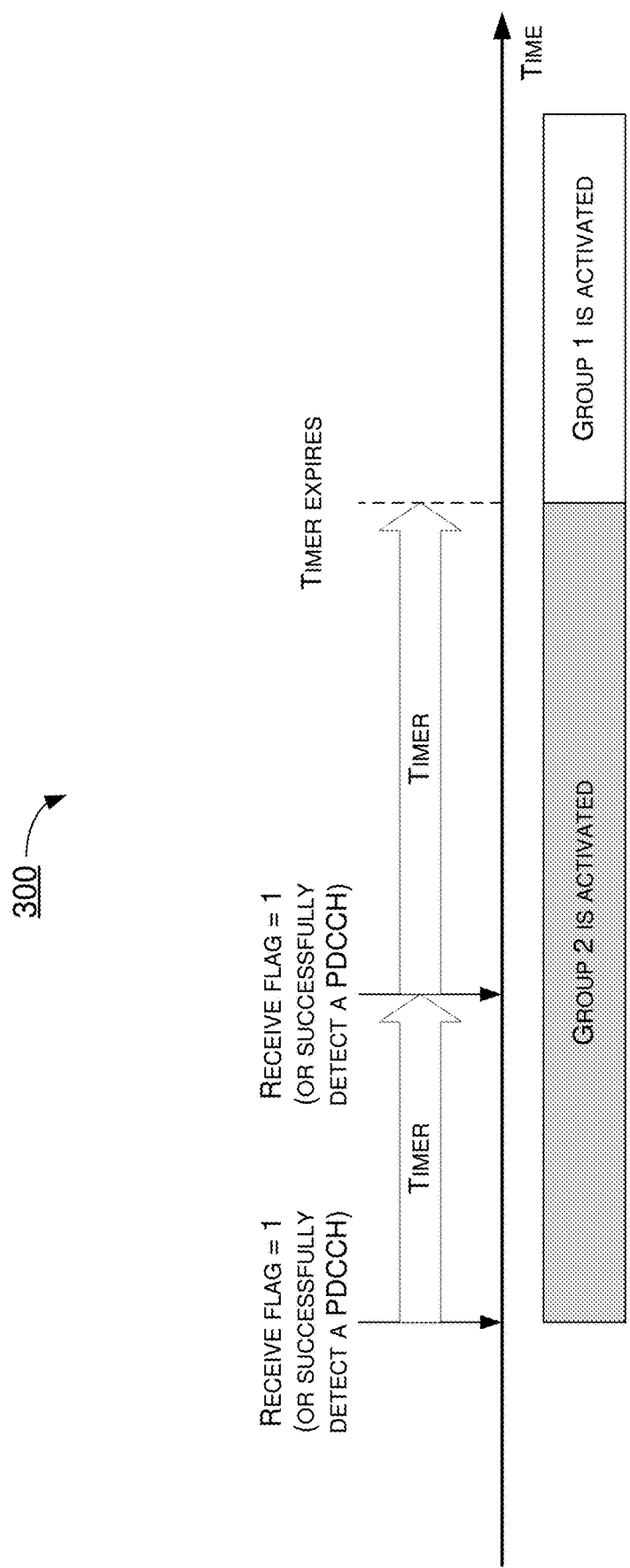
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a plurality of network nodes, which may be a part of a wireless communication network (e.g., an LTE network, a 5G network, an NR network, an IoT network, an NB-IoT network or an IIoT network). Scenario 300 illustrates search space set group switching based on a timer. The timer (e.g., searchSpaceSwitchingTimer) may be configured to the UE for a serving cell. In one implementation, a switching flag may be configured to be present for the serving cell in a group common DCI. On the serving cell, in an event that the UE receives the group common DCI including the switching flag that indicates a switching from Group 1 to Group 2 (e.g., flag=1), the UE may start or restart the timer. In an event that the timer expires, the UE may switch from Group2 to Group1 on the serving cell immediately or after a time offset. In another implementation, a switching flag may be not configured to be present for the serving cell in a group common DCI. On the serving cell, in an event that the UE successfully detects a PDCCH, the UE may start or restart the timer. In an event that the timer expires, the UE may switch from Group2 to Group1 on the serving cell immediately or after a time offset.

In some implementations, the indication may comprise an ending or exceeding of an indicated duration of a COT. For example, the UE may be configured to switches from the second group of search space set to the first group of search space set on all serving cells in the cell group in an event that the end of a COT is detected or determined.

In some implementations, the UE may be configured to transmit a capability report or a capability signaling to indicate the supportability of the dynamic PDCCH monitoring. For example, the UE may transmit a capability report to indicate the support of joint search space set group switching across multiple cells. The UE may be able to be configured with a group of cells and switch search space set group jointly over these cells. Without this capability, the UE will switch search space set groups for different cells independently.

In some implementations, the UE may be configured to transmit a capability report to indicate a support of search space set group switching. After that, the UE may receive a first configuration and a second configuration. The UE may perform control signal monitoring according to the first configuration. The UE may determine to switch to the second configuration according to an indication. Then, the UE may perform the control signal monitoring according to the second configuration.

In some implementations, the support of search space set group switching reported by the UE may comprise a support of search space set group switching with a DCI (e.g., DCI format 2_0) monitoring, or a support of search space set group switching with an implicit PDCCH decoding and without DCI monitoring.

In some implementations, the support of search space set group switching reported by the UE may comprise a search space set group switching delay. It is not possible for the UE to changing PDCCH monitoring immediately, and a group switching delay would be necessary. Thus, the UE may signal support of group switching for dynamic PDCCH monitoring and group switching delay as a part of capability signaling. For example, the UE may indicate a support of search space set group switching for a UE processing capability (e.g., UE processing capability 1 or UE processing capability 2).

Depending on the group switching delay, the UE may switch from a first search space set group to a second search space set group at the first or second slot boundary of the indicated COT after a DCI is detected. After the end of the indicated COT and no new COT is indicated for the serving cell, the UE may switch back to the first search space set group.

In some implementations, the switching group configuration may comprise a parameter (e.g., searchSpaceSwitchingGroupList) indicating a list of serving cells which are bundled for search space group switching purpose. In an event that the UE is provided searchSpaceSwitchingGroupList, indicating one or more groups of serving cells, the dynamic PDCCH monitoring related procedures apply to all serving cells within each group.

In some implementations, the UE may be provided by a parameter (e.g., searchSpaceSwitchingDelay) to indicate a number of symbols $P_{switch}$ where minimum values of $P_{switch}$ is provided for UE processing capability 1 and UE processing capability 2 and sub-carrier spacing (SCS) configuration. For example, $P_{switch}$=25 symbols for $\mu$=0/1/2 SCS for UE processing capability 1. $P_{switch}$=10/12/22 symbols for $\mu$=0/1/2 SCS for UE processing capability 2. In an event that the UE indicates a corresponding capability, the UE applies the $P_{switch}$ value for UE processing capability 2; otherwise, the UE applies the $P_{switch}$ value for UE processing capability 1 for SCS configuration $\mu$.

In some implementations, the UE may be provided by a timer value (e.g., searchSpaceSwitchingTimer). The timer in slots for monitoring PDCCH in the active downlink BWP of the serving cell before moving to the default search space group (e.g., Group 1). The UE decrements the timer value by one after each slot for a reference SCS configuration $\mu$.

In some implementations, the UE may be provided by a parameter (e.g., SearchSpaceSwitchTrigger) to indicate a location of a search space set group switching flag field for a serving cell in a DCI format 2_0. In an event that the UE detects a DCI format 2_0 and a value of the search space set group switching flag field in the DCI format 2_0 is 0, the UE starts monitoring PDCCH according to search space sets with group index 0, and stops monitoring PDCCH according to search space sets with group index 1, on the serving cell at a first slot that is at least $P_{switch}$ symbols after the last symbol of the PDCCH with the DCI format 2_0. In an event that the UE detects a DCI format 2_0 and a value of the search space set group switching flag field in the DCI format 2_0 is 1, the UE starts monitoring PDCCH according to search space sets with group index 1, and stops monitoring PDCCH according to search space sets with group index 0, on the serving cell at a first slot that is at least $P_{switch}$ symbols after the last symbol of the PDCCH with the DCI format 2_0, and the UE sets the timer value to the value provided by searchSpaceSwitchingTimer. In an event that the UE monitors PDCCH on a serving cell according to search space sets with group index 1, the UE starts monitoring PDCCH on the serving cell according to search space sets with group index 0, and stops monitoring PDCCH according to search space sets with group index 1, on the serving cell at the beginning of the first slot that is at least $P_{switch}$ symbols after a slot where the timer expires or after a last symbol of a remaining channel occupancy duration for the serving cell that is indicated by DCI format 2_0.

In some implementations, the UE may not be provided by a parameter (e.g., SearchSpaceSwitchTrigger) for a serving cell. In an event that the UE detects a DCI format by monitoring PDCCH according to a search space set with group index 0, the UE starts monitoring PDCCH according to search space sets with group index 1, and stops monitoring PDCCH according to search space sets with group index 0, on the serving cell at a first slot that is at least $P_{switch}$ symbols after the last symbol of the PDCCH with the DCI format. The UE sets the timer value to the value provided by searchSpaceSwitchingTimer in an event that the UE detects a DCI format by monitoring PDCCH in any search space set. In an event that the UE monitors PDCCH on a serving cell according to search space sets with group index 1, the UE starts monitoring PDCCH on the serving cell according to search space sets with group index 0, and stops monitoring PDCCH according to search space sets with group index 1, on the serving cell at the beginning of the first slot that is at least $P_{switch}$ symbols after a slot where the timer expires or, in an event that the UE is provided a search space set to monitor PDCCH for detecting a DCI format 2_0, after a last symbol of a remaining channel occupancy duration for the serving cell that is indicated by DCI format 2_0. The UE determines a slot and a symbol in the slot to start or stop PDCCH monitoring according to search space sets for a set of serving cells, provided by searchSpaceSwitchingGroupList, based on the smallest SCS configuration μ of the active BWPs in the set of serving cells and, if any, in the serving cell where the UE receives a PDCCH and detects a corresponding DCI format 2_0 triggering the start or stop of PDCCH monitoring according to search space sets.

Illustrative Implementations

Figure 4:
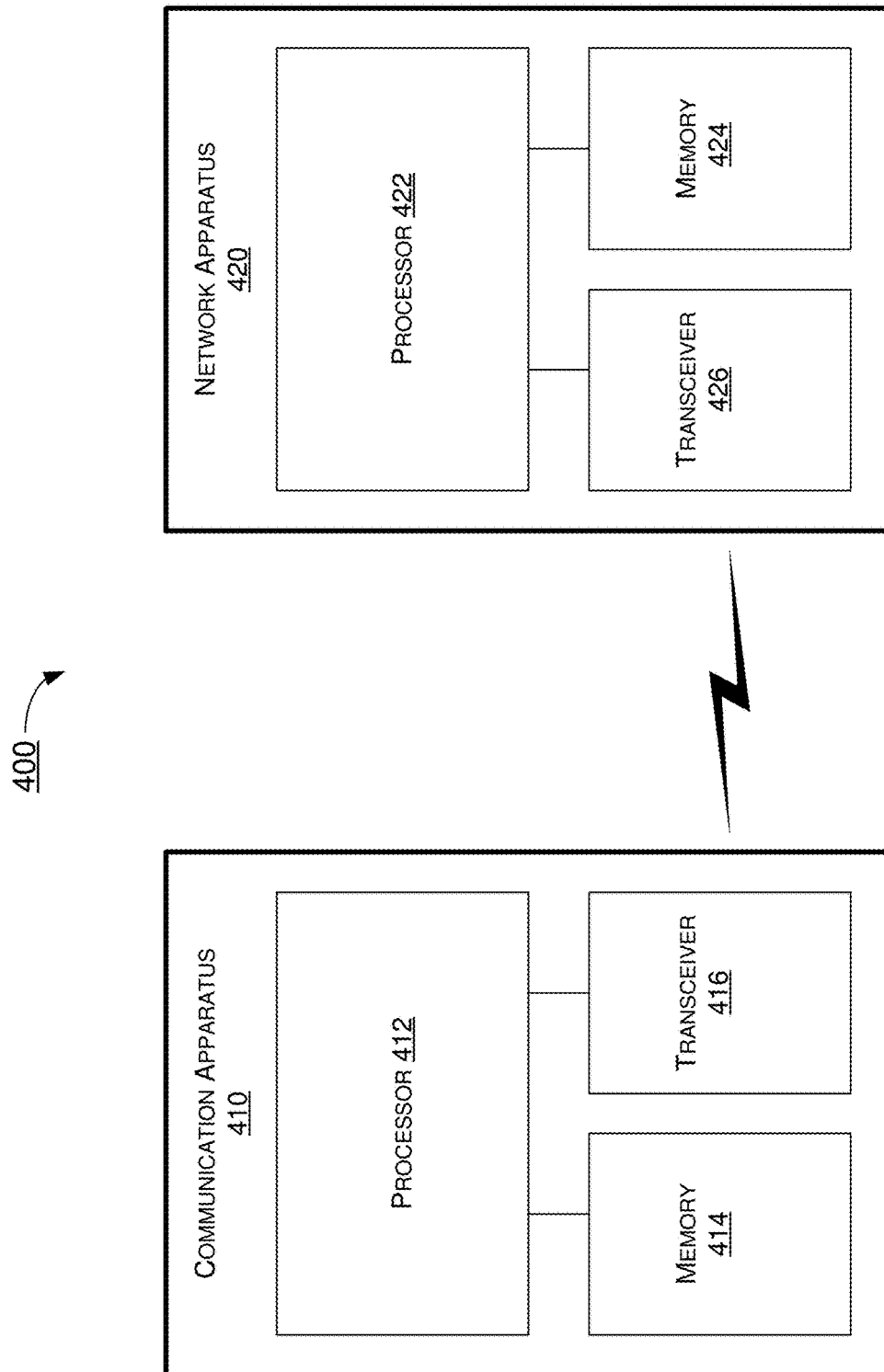
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to dynamic PDCCH monitoring among a plurality of network apparatus with respect to user equipment and network apparatus in wireless communications, including scenarios/schemes described above as well as processes 500 and 600 described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 410 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router or a gateway. For instance, network apparatus 420 may be implemented in an eNodeB in an LTE, LTE-Advanced or LTE-Advanced Pro network or in a gNB in a 5G, NR, IoT, NB-IoT or IIoT network. Alternatively, network apparatus 420 may be implemented in the form of one or more IC chips such as, for example and without limitation, one or more single-core processors, one or more multi-core processors, or one or more RISC or CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including power consumption reduction in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE and network apparatus 420 is implemented in or as a network node of a communication network.

In some implementations, processor 412 may be configured and/or connect, via transceiver 416, to a plurality of network apparatus. Processor 412 may receiver, via transceiver 416, a switching group configuration indicating a group of network apparatus (e.g., a network apparatus group) which are bundled for search space set group switching. Processor 412 may receive, via transceiver 416, a first configuration (e.g., a first PDCCH configuration) and a second configuration (e.g., a second PDCCH configuration). The first configuration may comprise a first group of search space set which comprises more frequent PDCCH monitoring occasions. The second configuration may comprise a second group of search space set which comprises less frequent PDCCH monitoring occasions.

In some implementations, processor 412 may be configured to perform control signal monitoring (e.g., PDCCH monitoring) according to the first configuration. Then, processor 412 may determine whether an indication of group switching for dynamic PDCCH monitoring is detected. The indication may associate with a network apparatus (e.g., a first network apparatus) in the network apparatus group. Processor 412 may determine to switch to the second configuration on the first network apparatus of the group of network apparatus according to the indication associated with the first network apparatus. Processor 412 may further apply the switching to all network apparatus within the group of network apparatus according to the indication associated with the first network apparatus.

In some implementations, the indication may comprise a switching flag configured to be present for a network apparatus in the network apparatus group in a DCI (e.g., group common DCI). On the network apparatus in the network apparatus group (e.g., the first network apparatus), in an event that processor 412 receives, via transceiver 416, the group common DCI including the switching flag (e.g., flag=1) that indicates a switching from the first group of search space set (e.g., Group 1) to the second group of search space set (e.g., Group 2), processor 412 may determine to switch to the second group of search space set on the first network apparatus of the network apparatus group. Processor 412 may further apply the switching to all network apparatus within the network apparatus group according to the indication associated with the first network apparatus. Then, processor 412 may start or restart a timer. The timer may be configured for the first network apparatus or for the network apparatus group. In an event that the timer expires, processor 412 may be configured to switches from the second group of search space set (e.g., Group 2) to the first group of search space set (e.g., Group 1) on all network apparatus in the network apparatus group immediately of after a time offset.

In some implementations, in an event that a switching flag is not configured to be present for a network apparatus in the network apparatus group in a DCI, the indication may comprise detection of a PDCCH. On the network apparatus (e.g., the first network apparatus) in the network apparatus group, in an event that processor 412 successfully detects a PDCCH, processor 412 may determine to switch to the second group of search space set on the first network apparatus of the network apparatus group. Processor 412 may further apply the switching to all network apparatus within the network apparatus group according to the indication associated with the first network apparatus. Then, processor 412 may start or restart the timer. The timer may be configured for the first network apparatus or for the network apparatus group. In an event that the timer expires, processor 412 may be configured to switches from the second group of search space set (e.g., Group 2) to the first group of search space set (e.g., Group 1) on all network apparatus in the network apparatus group immediately of after a time offset.

In some implementations, the indication may comprise an ending or exceeding of an indicated duration of a COT. For example, processor 412 may be configured to switches from the second group of search space set to the first group of search space set on all network apparatus in the network apparatus group in an event that the end of a COT is detected or determined.

In some implementations, processor 412 may be configured to transmit, via transceiver 416, a capability report or a capability signaling to indicate the supportability of the dynamic PDCCH monitoring. For example, processor 412 may transmit, via transceiver 416, a capability report to indicate the support of joint search space set group switching across multiple cells. Processor 412 may be able to be configured with a group of network apparatus and switch search space set group jointly over these network apparatus. Without this capability, processor 412 will switch search space set groups for different network apparatus independently.

In some implementations, processor 412 may be configured to transmit a capability report to indicate a support of search space set group switching. After that, processor 412 may receive, via transceiver 416, a first configuration and a second configuration. Processor 412 may perform control signal monitoring according to the first configuration. Processor 412 may determine to switch to the second configuration according to an indication. Then, processor 412 may perform the control signal monitoring according to the second configuration.

In some implementations, the support of search space set group switching reported by processor 412 may comprise a support of search space set group switching with a DCI (e.g., DCI format 2_0) monitoring, or a support of search space set group switching with an implicit PDCCH decoding and without DCI monitoring.

In some implementations, the support of search space set group switching reported by processor 412 may comprise a search space set group switching delay. It is not possible for communication apparatus 410 to changing PDCCH monitoring immediately, and a group switching delay would be necessary. Thus, processor 412 may signal support of group switching for dynamic PDCCH monitoring and group switching delay as a part of capability signaling. For example, processor 412 may indicate a support of search space set group switching for a processing capability (e.g., processing capability 1 or processing capability 2).

Illustrative Processes

Figure 5:
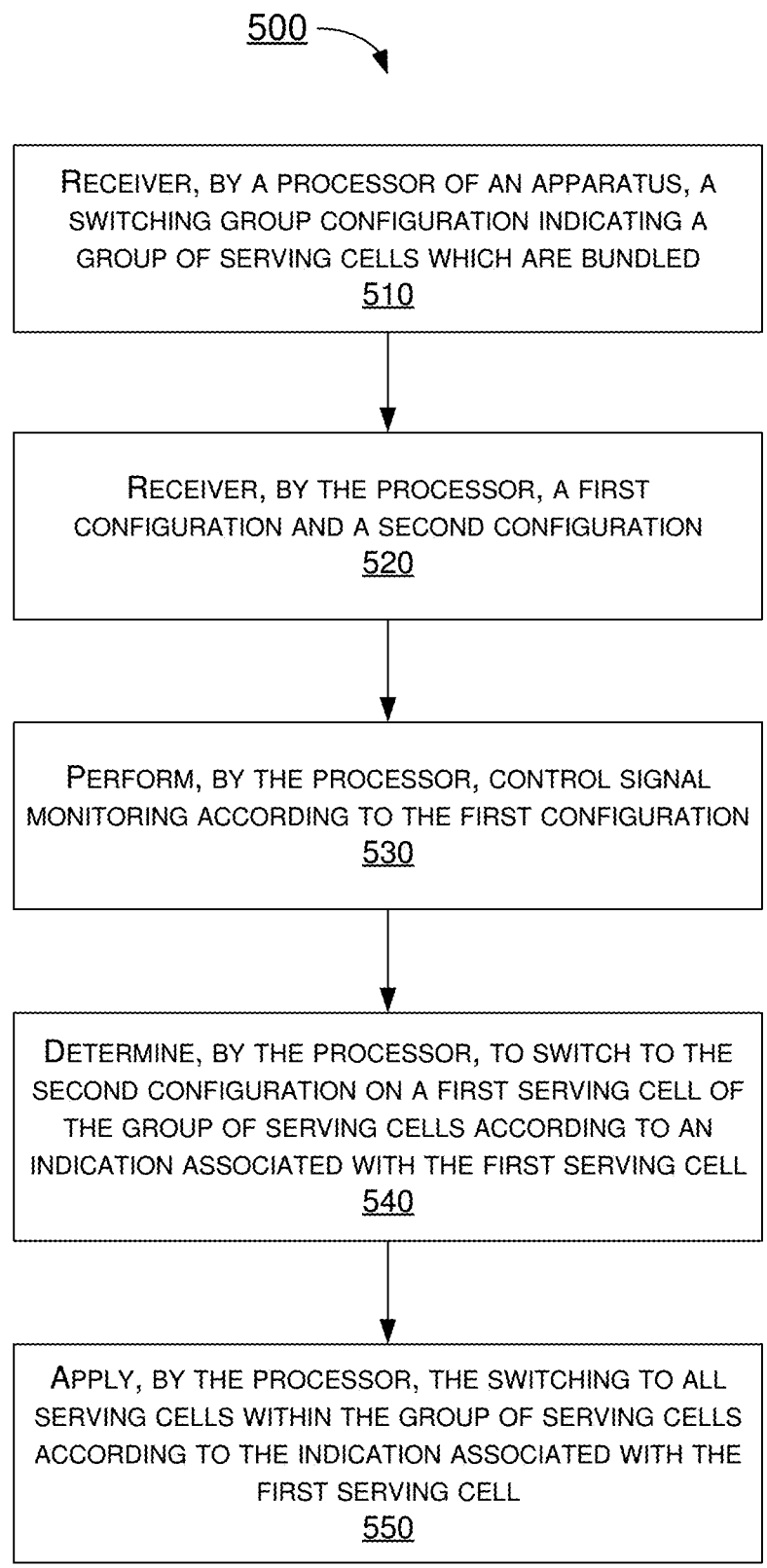
FIG. 5 is a flowchart of an example process in accordance with an implementation of the present disclosure.

FIG. 5 illustrates an example process 500 in accordance with an implementation of the present disclosure. Process 500 may be an example implementation of above scenarios/schemes, whether partially or completely, with respect to dynamic PDCCH monitoring among a plurality of serving cells with the present disclosure. Process 500 may represent an aspect of implementation of features of communication apparatus 410. Process 500 may include one or more operations, actions, or functions as illustrated by one or more of blocks 510, 520, 530, 540 and 550. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 410. Process 500 may begin at block 510.

At 510, process 500 may involve processor 412 of apparatus 410 receiving a switching group configuration indicating a group of serving cells which are bundled. Process 500 may proceed from 510 to 520.

At 520, process 500 may involve processor 412 receiving a first configuration and a second configuration. Process 500 may proceed from 520 to 530.

At 530, process 500 may involve processor 412 performing control signal monitoring according to the first configuration. Process 500 may proceed from 530 to 540.

At 540, process 500 may involve processor 412 determining to switch to the second configuration on a first serving cell of the group of serving cells according to an indication associated with the first serving cell. Process 500 may proceed from 540 to 550.

At 550, process 500 may involve processor 412 applying the switching to all serving cells within the group of serving cells according to the indication associated with the first serving cell.

In some implementations, the first configuration may comprise a first group of search space set. The second configuration may comprise a second group of search space set.

In some implementations, the indication may comprise a switching flag in a DCI received from the first serving cell.

In some implementations, the indication may comprise expiration of a timer.

In some implementations, the indication may comprise an ending of an indicated duration of a COT.

In some implementations, the indication may comprise detection of a PDCCH.

In some implementations, process 500 may involve processor 412 transmitting a capability report to indicate a support of joint search space set group switching.

Figure 6:
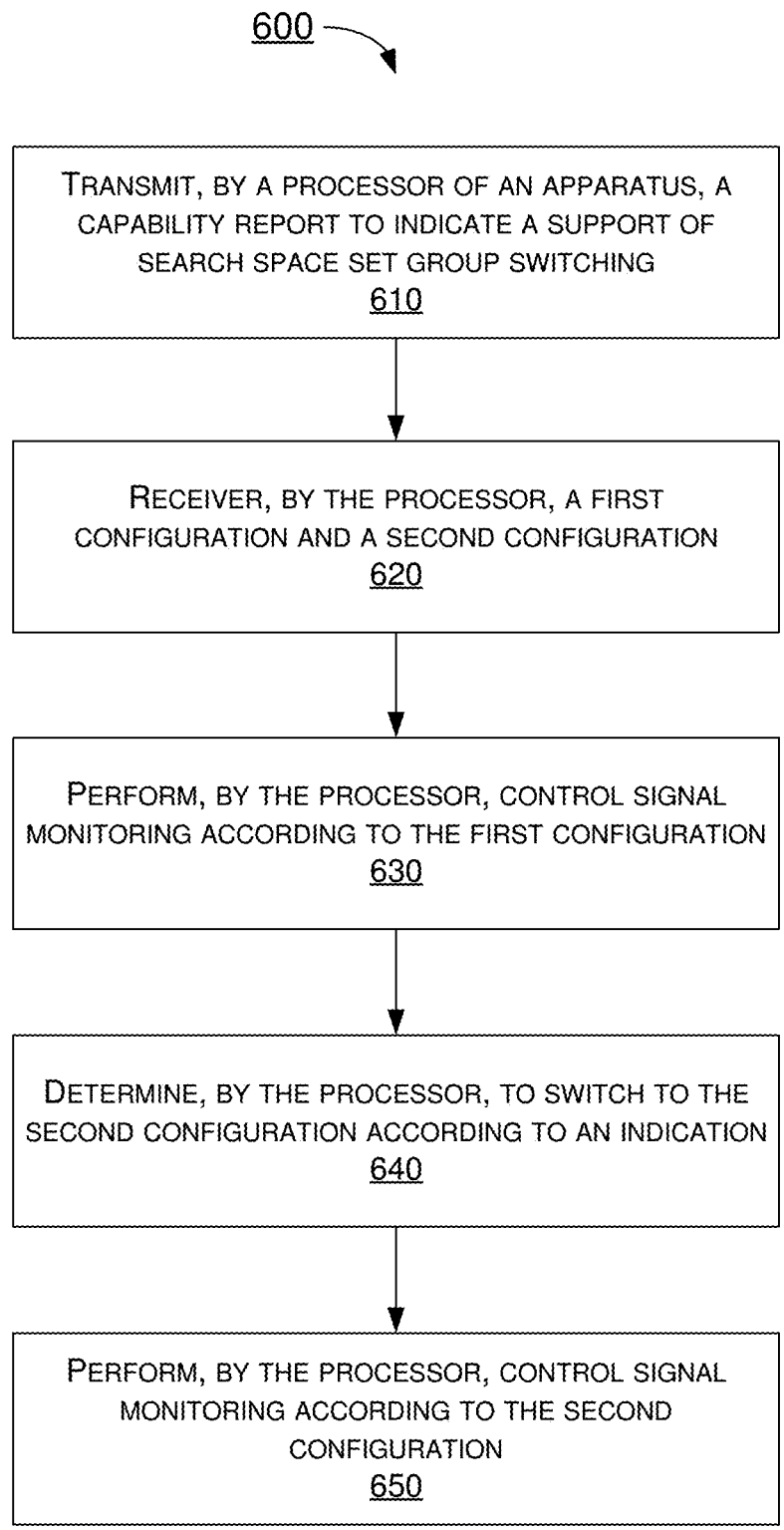
FIG. 6 is a flowchart of an example process in accordance with an implementation of the present disclosure.

FIG. 6 illustrates an example process 600 in accordance with an implementation of the present disclosure. Process 600 may be an example implementation of above scenarios/schemes, whether partially or completely, with respect to dynamic PDCCH monitoring among a plurality of serving cells with the present disclosure. Process 600 may represent an aspect of implementation of features of communication apparatus 410. Process 600 may include one or more operations, actions, or functions as illustrated by one or more of blocks 610, 620, 630, 640 and 650. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by communication apparatus 410 or any suitable UE or machine type devices. Solely for illustrative purposes and without limitation, process 600 is described below in the context of communication apparatus 410. Process 600 may begin at block 610.

At 610, process 600 may involve processor 412 of apparatus 410 transmitting a capability report to indicate a support of search space set group switching. Process 600 may proceed from 610 to 620.

At 620, process 600 may involve processor 412 receiving a first configuration and a second configuration. Process 600 may proceed from 620 to 630.

At 630, process 600 may involve processor 412 performing control signal monitoring according to the first configuration. Process 600 may proceed from 630 to 640.

At 640, process 600 may involve processor 412 determining to switch to the second configuration according to an indication. Process 600 may proceed from 640 to 650.

At 650, process 600 may involve processor 412 performing the control signal monitoring according to the second configuration.

In some implementations, the support may comprise a support of search space set group switching with a DCI monitoring, or a support of search space set group switching with a PDCCH decoding.

In some implementations, the support may comprise a search space set group switching delay.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically

What is claimed is:

1. A method, comprising:
receiving, by a processor of an apparatus, a switching group configuration indicating a group of serving cells which are bundled, the group of serving cells comprising a first serving cell and one or more other serving cells;
receiving, by the processor, a first physical downlink control channel (PDCCH) configuration and a second PDCCH configuration;
performing, by the processor, control signal monitoring according to the first PDCCH configuration;
determining, by the processor, to switch to the second PDCCH configuration on the first serving cell of the group of serving cells according to an indication associated with the first serving cell; and
applying, by the processor, a PDCCH configuration switching to all serving cells within the group of serving cells according to the indication associated with the first serving cell to switch from the first PDCCH configuration to the second PDCCH configuration on the one or more other serving cells of the group of serving cells,
wherein the switching group configuration provides either or both of:
a parameter indicating a number of symbols applied for a user equipment (UE) processing capability and a sub-carrier spacing (SCS) configuration; and
a timer value as a number of slots in monitoring a PDCCH in an active downlink bandwidth part (BWP).

2. The method of claim 1, wherein the first configuration comprises a first group of search space set, and wherein the second configuration comprises a second group of search space set.

3. The method of claim 1, wherein the indication comprises a switching flag in a downlink control information (DCI) received from the first serving cell.

4. The method of claim 1, wherein the indication comprises expiration of a timer.

5. The method of claim 1, wherein the indication comprises an ending of an indicated duration of a channel occupancy time (COT).

6. The method of claim 1, wherein the indication comprises detection of the PDCCH.

7. The method of claim 1, further comprising:
transmitting, by the processor, a capability report to indicate a support of joint search space set group switching.

8. A method, comprising:
transmitting, by a processor of an apparatus, a capability report to indicate a support of joint search space set group switching across multiple serving cells involving the apparatus switching from one configuration to another configuration on all serving cells in a group of serving cells upon determining to apply the switching based on an indication associated with one serving cell among of a plurality of serving cells in the group of serving cells;
receiving, by the processor, a switching group configuration;
receiving, by the processor, a first configuration and a second configuration;

performing, by the processor, control signal monitoring according to the first configuration;
determining, by the processor, to switch to the second configuration according to an indication; and
performing, by the processor, the control signal monitoring according to the second configuration,
wherein the switching group configuration provides either or both of:
  a parameter indicating a number of symbols applied for a user equipment (UE) processing capability and a sub-carrier spacing (SCS) configuration; and
  a timer value as a number of slots in monitoring a physical downlink control channel (PDCCH) in an active downlink bandwidth part (BWP).

9. The method of claim 8, wherein the support comprises a support of search space set group switching with a downlink control information (DCI) monitoring, or a support of search space set group switching with a PDCCH decoding.

10. The method of claim 8, wherein the support comprises a search space set group switching delay.

11. An apparatus, comprising:
a transceiver which, during operation, wirelessly communicates with a plurality of network nodes of a wireless network; and
a processor communicatively coupled to the transceiver such that, during operation, the processor performs operations comprising:
  receiving, via the transceiver, a switching group configuration indicating a group of network nodes which are bundled, the group of network nodes comprising a first network node and one or more other network nodes;
  receiving, via the transceiver, a first configuration and a second configuration;
  performing, via the transceiver, control signal monitoring according to the first configuration;
  determining to switch to the second configuration on the first network node of the group of network nodes according to an indication associated with the first network node; and
  applying the switching to all network nodes within the group of network nodes according to the indication associated with the first network node to switch from the first configuration to the second configuration on the one or more other network nodes of the group of network nodes,
wherein the switching group configuration provides either or both of:
  a parameter indicating a number of symbols applied for a user equipment (UE) processing capability and a sub-carrier spacing (SCS) configuration; and
  a timer value as a number of slots in monitoring a physical downlink control channel (PDCCH) in an active downlink bandwidth part (BWP).

12. The apparatus of claim 11, wherein the first configuration comprises a first group of search space set, and wherein the second configuration comprises a second group of search space set.

13. The apparatus of claim 11, wherein the indication comprises a switching flag in a downlink control information (DCI) received from the first network node.

14. The apparatus of claim 11, wherein the indication comprises expiration of a timer.

15. The apparatus of claim 11, wherein the indication comprises an ending of an indicated duration of a channel occupancy time (COT).

16. The apparatus of claim 11, wherein the indication comprises detection of the PDCCH.

17. The apparatus of claim 11, wherein, during operation, the processor further performs operations comprising:
  transmitting, via the transceiver, a capability report to indicate a support of joint search space set group switching.

18. An apparatus, comprising:
a transceiver which, during operation, wirelessly communicates with a plurality of network nodes of a wireless network; and
a processor communicatively coupled to the transceiver such that, during operation, the processor performs operations comprising:
  transmitting, via the transceiver, a capability report to indicate a support of joint search space set group switching across multiple serving cells involving the apparatus switching from one configuration to another configuration on all network nodes of the plurality of network nodes upon determining to apply the switching based on an indication associated with one network node among of the plurality of plurality of network nodes;
  receiving, via the transceiver, a switching group configuration;
  receiving, via the transceiver, a first configuration and a second configuration;
  performing, via the transceiver, control signal monitoring according to the first configuration;
  determining to switch to the second configuration according to an indication; and
  performing, via the transceiver, the control signal monitoring according to the second configuration,
wherein the switching group configuration provides either or both of:
  a parameter indicating a number of symbols applied for a user equipment (UE) processing capability and a sub-carrier spacing (SCS) configuration; and
  a timer value as a number of slots in monitoring a physical downlink control channel (PDCCH) in an active downlink bandwidth part (BWP).

19. The apparatus of claim 18, wherein the support comprises a support of search space set group switching with a downlink control information (DCI) monitoring, or a support of search space set group switching with a PDCCH decoding.

20. The apparatus of claim 18, wherein the support comprises a search space set group switching delay.

* * * * *